J. OLIVER.

Chills for Casting Mold-Boards.

No. 5,321. Reissued March 11, 1873.

WITNESSES.
John A. Ellis.
Wm. A. Ellis

INVENTOR.
James Oliver
per
C. H. Watson & Co
attys.

AM. PHOTO-LITHOGRAPHIC CO. N.Y. (OSBORNE'S PROCESS.)

UNITED STATES PATENT OFFICE.

JAMES OLIVER, OF SOUTH BEND, INDIANA.

IMPROVEMENT IN CHILLS FOR CASTING MOLD-BOARDS.

Specification forming part of Letters Patent No. 86,579, dated February 2, 1869; reissue No. 5,321, dated March 11, 1873.

*To all whom it may concern:*

Be it known that I, JAMES OLIVER, of South Bend, in the county of St. Joseph and State of Indiana, have invented certain new and useful Improvements in Chill for Casting Mold-Boards for Plows; and I do hereby declare that the following is a full, clear, and exact description thereof, reference being had to the accompanying drawing and to the letters of reference marked thereon which form a part of this specification.

The nature of my invention consists of a chill for casting mold-boards for plows constructed to conform to the shape of the mold-board, and provided with seams or openings to allow the escape of steam and gas, as will be hereinafter more fully set forth.

In order to enable others skilled in the art to which my invention appertains to make and use the same, I will now proceed to describe its construction and operation, referring to the annexed drawing, in which—

Figure 1:
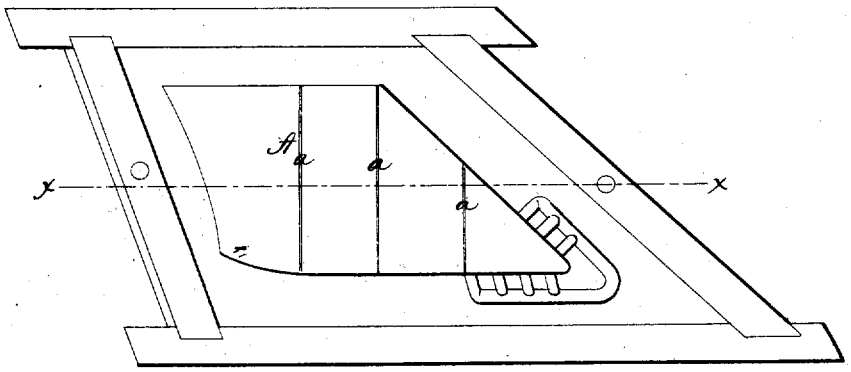
Figure 2:
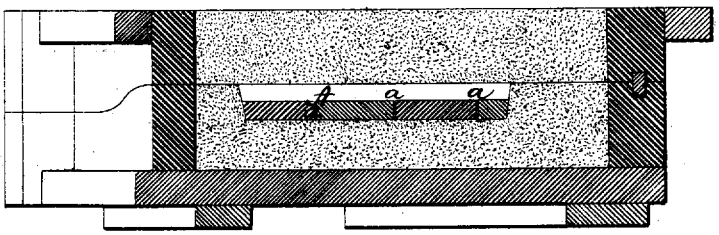
Figure 3:
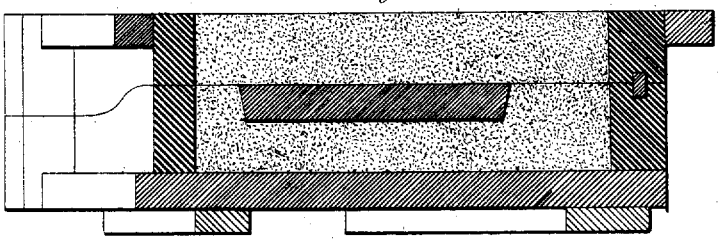

Figure 1 is a plan view of the chill and lower portion of the mold. Fig. 2 is a vertical section of the same taken in the line *x x*, Fig. 1, and Fig. 3 is a vertical section of the mold and pattern.

Heretofore there has been considerable difficulty in the perfect and equal chilling of mold-boards by a lack of opportunity for the escape of the steam and gas which collects on the surface between the molten metal and the chill, thereby causing a part to be imperfectly chilled.

To overcome this difficulty, I form, in the chill A, a series of seams or openings, *a a*, which may be of any suitable width only, so that they will allow the steam and gas to escape, and thus allow all of the molten metal to come in contact with the chill. The chill A is made from suitable patterns so as to conform exactly to the shape of the mold-board to be cast and chilled, and thus produce a chilled mold-board of the precise shape and form desired.

The mold-board and chill-pattern are united in one, and it is molded in the usual manner. The pattern is then removed, and, having the chill hot, it is placed in its proper place and molten metal poured in. The chill is made in sections placed side by side, forming thus the seams or openings *a a*, which prevents warping the mold-board, as is often the case when the hot iron strikes one part of a full-sized chill; and should any one of the sections be injured by contact with the melted iron it can be replaced at much less expense than a whole chill.

The object of uniting the chill-patterns and the patterns of the mold-boards is merely that in damp weather I can warm the chills and drop them in the places left by their impression.

Having thus fully described my invention, what I claim as new, and desire to secure by Letters Patent, is—

The chill for casting mold-boards for plows, constructed to conform to the shape of the mold-board, and provided with seams or openings to allow the escape of steam and gas, substantially for the purposes herein set forth.

In testimony that I claim the foregoing as my own, I affix my signature in presence of two witnesses.

JAMES OLIVER.

Witnesses:

FRANCIS R. TUTT,

WM. D. SMITH.